(12) United States Patent
Otsuki

(10) Patent No.: US 10,396,463 B2
(45) Date of Patent: Aug. 27, 2019

(54) ANTENNA DEVICE

(71) Applicant: Takashi Otsuki, Hyogo (JP)

(72) Inventor: Takashi Otsuki, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/353,349

(22) Filed: Nov. 16, 2016

(65) Prior Publication Data
US 2017/0149141 A1    May 25, 2017

(30) Foreign Application Priority Data

Nov. 19, 2015  (JP) ................... 2015-226316

(51) Int. Cl.
| | | |
|---|---|---|
| *H01Q 9/27* | (2006.01) | |
| *H01Q 1/22* | (2006.01) | |
| *H01Q 1/24* | (2006.01) | |
| *H04B 5/00* | (2006.01) | |
| *H01Q 7/06* | (2006.01) | |

(52) U.S. Cl.
CPC ............. *H01Q 9/27* (2013.01); *H01Q 1/2291* (2013.01); *H01Q 1/243* (2013.01); *H01Q 7/06* (2013.01); *H04B 5/0081* (2013.01)

(58) Field of Classification Search
CPC ........ H01Q 9/27; H01Q 1/243; H01Q 1/2291; H01Q 7/06; H04B 5/0081
See application file for complete search history.

(56) References Cited

U.S. PATENT DOCUMENTS

| | | |
|---|---|---|
| 2005/0162331 A1 | 7/2005 | Endo et al. |
| 2006/0214866 A1 | 9/2006 | Araki et al. |
| 2010/0053014 A1 | 3/2010 | Yosui et al. |
| 2012/0098350 A1* | 4/2012 | Campanella .......... B60L 3/0069 307/104 |
| 2014/0198011 A1* | 7/2014 | Tsubaki ................... H01Q 7/06 343/867 |
| 2016/0028160 A1 | 1/2016 | Otsuki |

FOREIGN PATENT DOCUMENTS

| | | |
|---|---|---|
| JP | 2006-050522 | 2/2006 |
| JP | 3896965 | 1/2007 |
| JP | 2010-056982 | 3/2010 |
| JP | 2014-179850 | 9/2014 |
| JP | 2014-195138 | 10/2014 |

* cited by examiner

*Primary Examiner* — Hai V Tran
*Assistant Examiner* — Michael M Bouizza
(74) *Attorney, Agent, or Firm* — Oblon, McClelland, Maier & Neustadt, L.L.P.

(57) ABSTRACT

An antenna device is formed by winding a conductive wire around a magnetic member unit, and in which the magnetic member unit comprises a plurality of magnetic-member individual pieces.

8 Claims, 15 Drawing Sheets

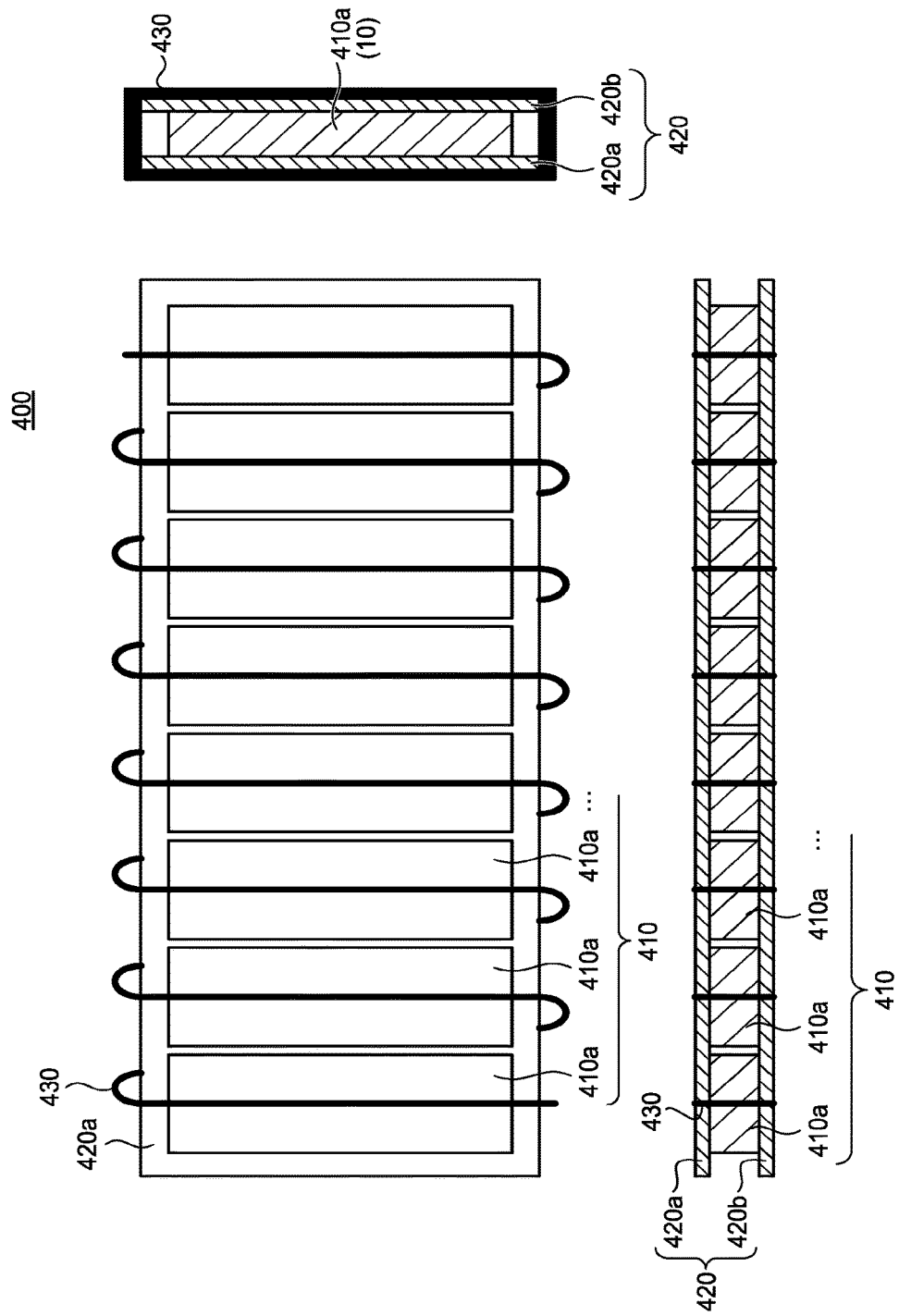

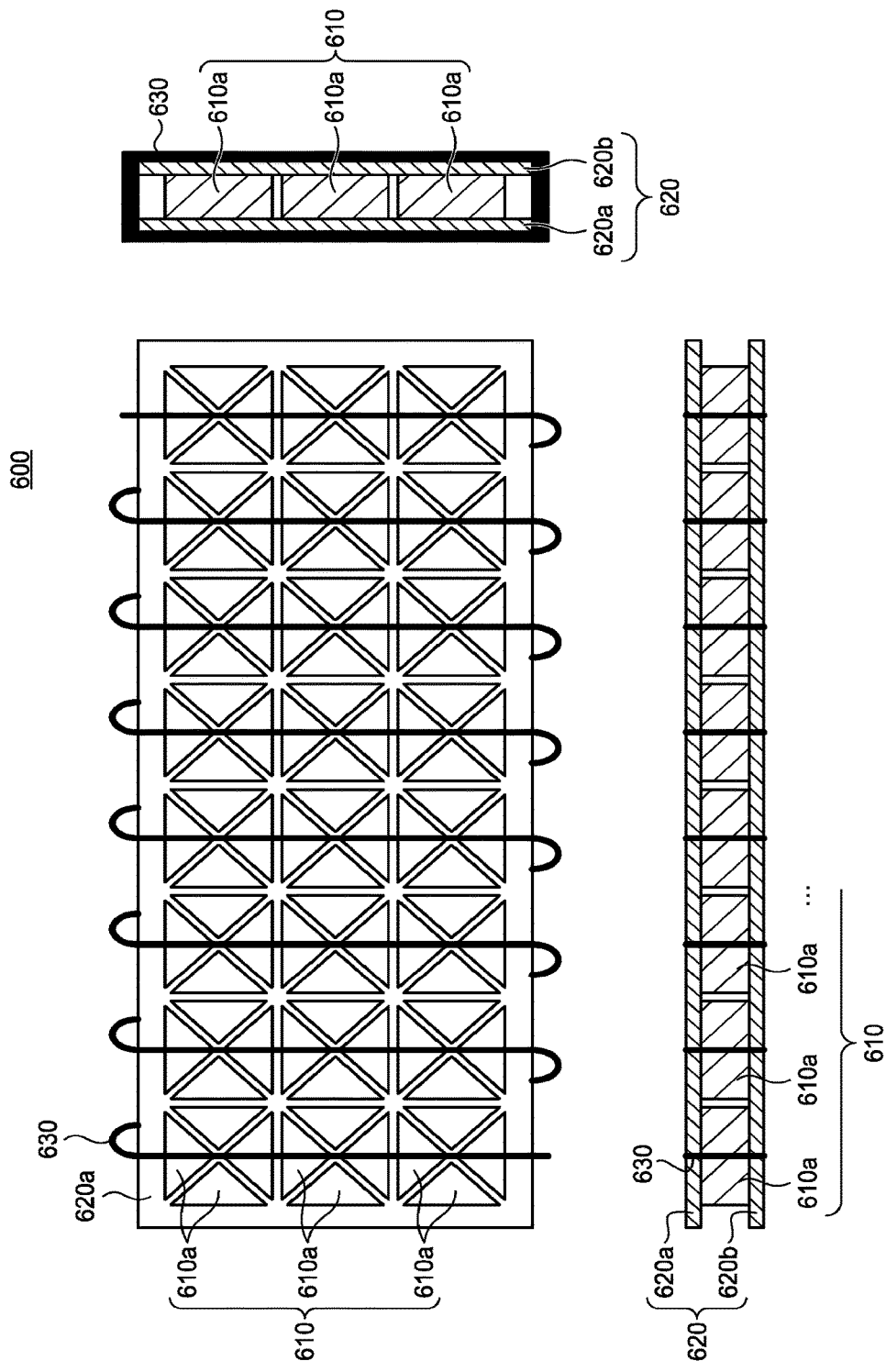

ANTENNA DEVICE

CROSS-REFERENCE TO RELATED APPLICATIONS

The present application claims priority under 35 U.S.C. § 119 to Japanese Patent Application No. 2015-226316 filed Nov. 19, 2015. The contents of which are incorporated herein by reference in their entirety.

BACKGROUND OF THE INVENTION

1. Field of the Invention

The present invention relates generally to antenna devices.

2. Description of the Related Art

Magnetic-coupling communication, a representative example of which is NFC (Near Field Communication), is used in mobile information terminals, such as smartphones and wearable terminals. To implement such communication feature, an antenna is mounted on such a mobile information terminal. With increasing miniaturization and functionality of such mobile information terminals, demand for more compact, slimmer antennas mounted thereon is also increasing.

With regard to antennas, a magnetic antenna formed by looping a flexible substrate, on which a coil conductor is formed, around and along the surface of a magnetic core, is disclosed in Japanese Unexamined Patent Application Publication No. 2010-056982 (Patent Document 1), for example. In this magnetic antenna, the magnetic core has a plate-like shape having at least two parallel sides; the coil conductor, whose conductor opening is the center of the loop, has a rectangular spiral shape having at least two parallel sides. In this magnetic antenna, the flexible substrate is bent along two sides, which are apart from the center of the conductor opening, of the coil conductor and along the two sides of the magnetic core. However, such an antenna is disadvantageous in that when a metal is present near the antenna, magnetic flux is impeded by a demagnetizing field induced by an eddy current, causing degradation in performance of magnetic coupling communication.

Under the circumstances, for example, Japanese Unexamined Patent Application Publication No. 2006-050522 (Patent Document 2) discloses the following magnetic sensor antenna for receiving a magnetic field component of an electromagnetic wave. The antenna, which is to be placed inside a casing and includes a magnetic core formed of a magnetic member and a conductive wire wound around the magnetic core, is configured such that each end, at which magnetic flux density is high, of the magnetic core is bent in a direction away from an adjacent portion of the casing or an adjacent metal component inside the casing. Such an antenna is less susceptible to a metal because the conductive wire is wound around the magnetic member.

However, although the structure of the above-descried conventional magnetic antenna, in which the conductive wire is wound around the magnetic core formed of the magnetic member, makes the magnetic antenna less susceptible to an influence of a metal present near the antenna, the structure disadvantageously narrows communication coverage area in a direction perpendicular to the direction, in which the conductive wire is wound.

Therefore, there is a need for an antenna device less susceptible to a metal present near the device or the apparatus and providing a wider communication coverage area.

SUMMARY OF THE INVENTION

According to exemplary embodiments of the present invention, there is provided an antenna device formed by winding a conductive wire around a magnetic member unit, wherein the magnetic member unit comprises a plurality of magnetic-member individual pieces.

BRIEF DESCRIPTION OF THE DRAWINGS

FIG. 10 is a diagram illustrating three views of an antenna device of a second embodiment;

FIG. 16 is a diagram illustrating three views of an antenna device of a third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
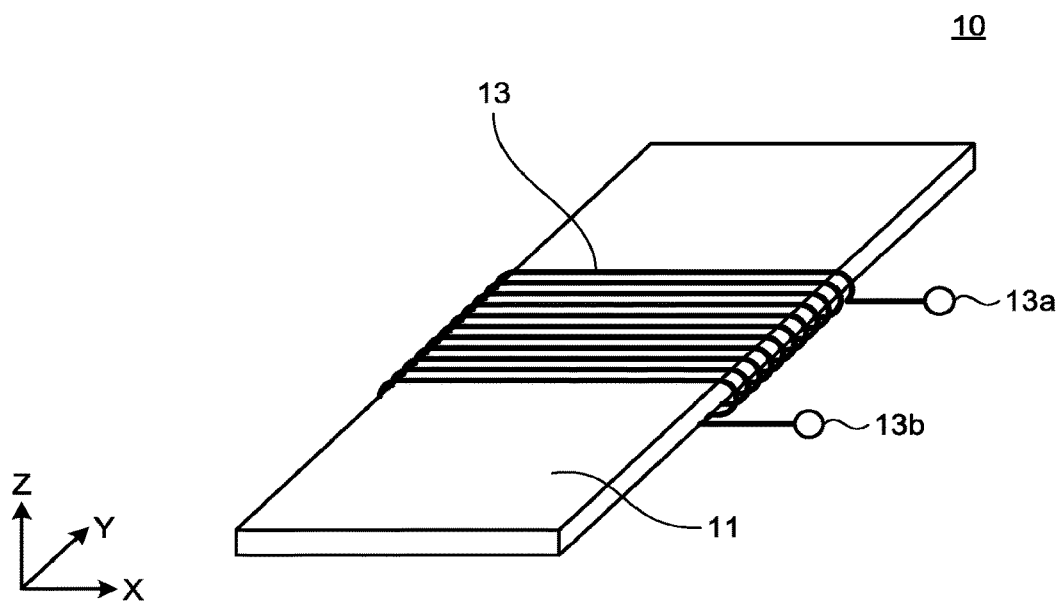
FIG. 1 is a perspective view illustrating an antenna device.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings.

First Embodiment

Figure 2:
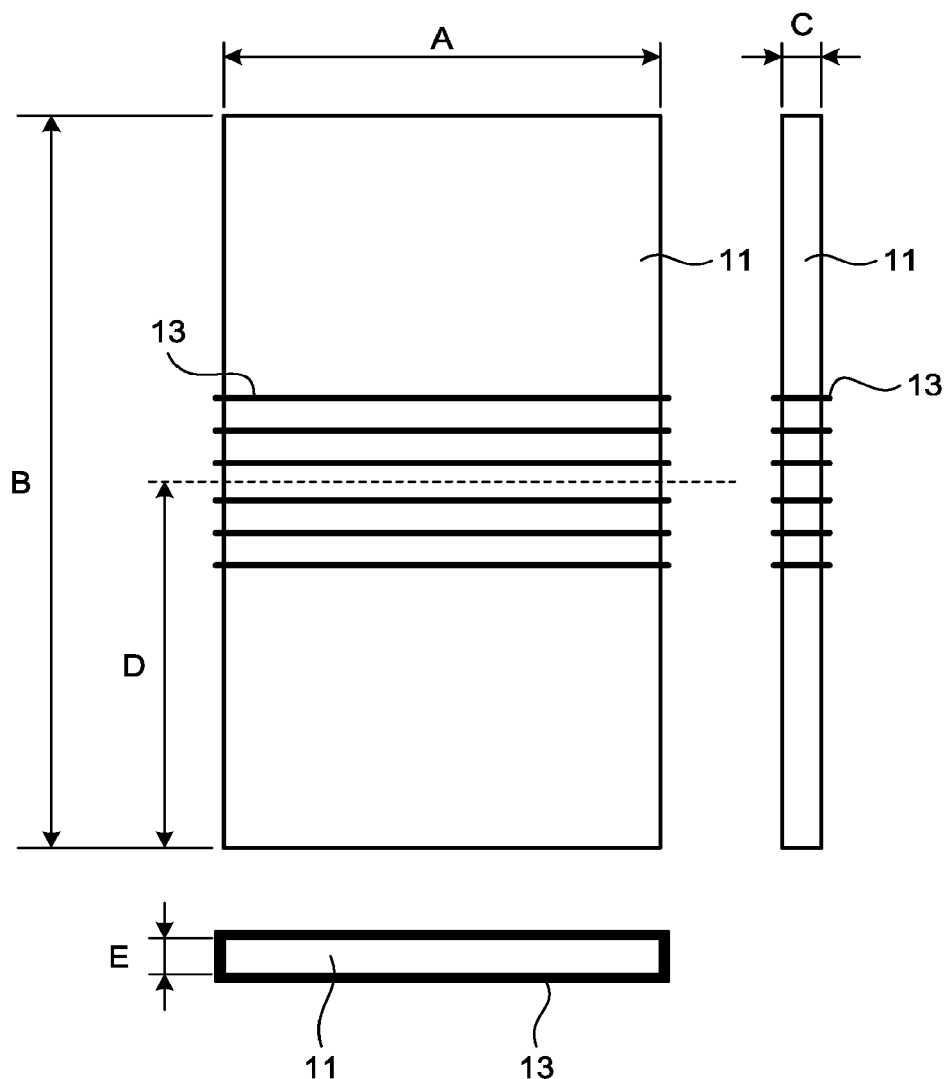
FIG. 2 is a diagram illustrating three views of the antenna device.

A magnetic-coupling antenna device is described first. FIG. 1 is a perspective view illustrating an antenna device. FIG. 2 is a diagram illustrating three views of the antenna device. In FIG. 1 and FIG. 2, an XYZ coordinate system, which is a Cartesian coordinate system, is defined relative to an antenna device 10.

The antenna device 10, which is a magnetic-coupling antenna device, includes a magnetic member unit 11 and a coil 13 as illustrated in FIG. 1.

In contrast to a resonant antenna device that produces resonance with a radio wave of a specific frequency, thereby transmitting or receiving the radio wave, the magnetic-coupling antenna device 10 performs communication by magnetically coupling with magnetic flux generated by an antenna device, with which the antenna device 10 performs communication. For this reason, whereas the resonant antenna device generally has a commutation range of from a few meters to several kilometers or longer, the magnetic-coupling antenna device 10 has a communication range of approximately one meter or shorter, for example.

Accordingly, the magnetic-coupling antenna device 10 is an antenna device for short-distance communication or near-field communication. The antenna device 10 illustrated in FIG. 1 transmits or receives signals at a frequency of 13.56 MHz, for example.

The magnetic member unit 11 is made of sintered ferrite formed into a rectangular parallelepiped shape that is 11 mm in a length A in the direction along the short side (the X-axis direction), 14 mm in a length B in the direction along the long side (the Y-axis direction), and 0.2 mm in a thickness C (which is the length in the Z-axis direction). The above-described size of the magnetic member unit 11 is only an example; alternatively, the magnetic member unit 11 may be a cube that is 5 mm in the length A in the direction along the short side (the X-axis direction), 5 mm in the length B in the direction along the long side (the Y-axis direction), and 5 mm in the thickness C (which is the length in the Z-axis direction).

While the magnetic member unit 11 preferably has a plate-like or cubic shape, the shape of the magnetic member unit 11 may be determined as desired depending on the size, shape, and the like of a space where the antenna device is to be mounted and depending on a necessary communication area, which depends on characteristics of the antenna device. The material of the magnetic member unit 11 is not limited to sintered ferrite, and iron, nickel, manganese, zinc, or an alloy of these metals may alternatively be used so long as it is what is generally referred to as a ferromagnetic material.

The magnetic member unit 11 may be a flexible sheet member having flexibility. The magnetic member unit 11 may be a member that can have a different shape depending on the shape of a casing, to which the magnetic member unit 11 is to be attached.

The coil 13 is formed by winding a conductive wire around a portion, which is at approximately center in the direction along the long side (the Y-axis direction) of the magnetic member unit 11, in the direction along the short side (the X-axis direction) of the magnetic member unit 11.

Hence, if the length B is 14 mm, a length D (see FIG. 2) between a center position, in the Y-axis direction, of the portion where the conductive wire is wound around the magnetic member unit 11 and an end on the negative side in the Y-axis direction of the magnetic member unit 11 is 7 mm; if the length B is 24 mm, the length D is 12 mm.

Terminal ends 13a and 13b on the both sides of the coil 13 are connected to a communication unit of an apparatus that performs communication using the antenna device 10. The communication unit performs communication with an external apparatus.

As the conductive wire of the coil 13, for example, a copper wire can be used. The thickness (wire diameter) of the conductive wire of the coil 13 may be 50 μm, for example. The number of turns the conductive wire is wound to form the coil 13 may be approximately 20, for example. A winding style of winding the conductive wire around the magnetic member unit 11 so as to place loops of the conductive wire in the coil 13 in close contact with each other is referred to as "dense winding". A winding style of winding the conductive wire so as to leave a predetermined spacing between each adjacent loops of the conductive wire in the coil 13, rather than placing them in contact with each other, is referred to as "sparse winding".

The surface of the conductive wire used as the coil 13 is coated with enamel. A thickness (wire diameter) of the enamel-coated conductive wire of the coil 13 is for example 69 μm. And, a thickness E (see FIG. 2) of the magnetic member unit 11 is for example 150 μm.

The thickness, the number of winding turns, and the winding style of the conductive wire of the coil 13 are only an example, and can be set as appropriate depending on usage and the like of the antenna device 10. The antenna device 10 is described below on an assumption that the conductive wire of the coil 13 is wound in the direction along the short side (hereinafter, "the short-side direction") of the magnetic member unit 11. The reason for this is that the magnetic member unit 11 exhibits more favorable characteristics when the coil 13 is wound in the short-side direction of the magnetic member unit 11 as illustrated in FIG. 2 than when wound in the direction along the long side (hereinafter, "the long-side direction") of the magnetic member unit 11.

Specifically, the conductive wire wound in loops in the short-side direction of the magnetic member unit 11 induces a demagnetizing field at each end (the end on the positive side in the Y-axis direction and the end on the negative side in the Y-axis direction) of the magnetic member unit 11. The magnitude of influence exerted by the demagnetizing fields decreases as the distance between the portion where the conductive wire is wound and the opposite ends of the magnetic member unit 11 increases. Furthermore, winding the conductive wire in the long-side direction of the magnetic member unit 11 increases the cross-sectional area, thereby making the magnetic reluctance smaller than when the conductive wire is wound in the short-side direction.

For the reasons described above, in the antenna device 10, it is preferable that the conductive wire of the coil 13 is wound in the short-side direction of the magnetic member unit 11 and that the magnetic member unit 11 is rectangular in plan view (i.e., when a top surface of the magnetic member unit 11 is viewed from above). It is also preferable that the portion where the conductive wire of the coil 13 is wound is the center portion, rather than an end portion, of the magnetic member unit 11.

Figure 3:
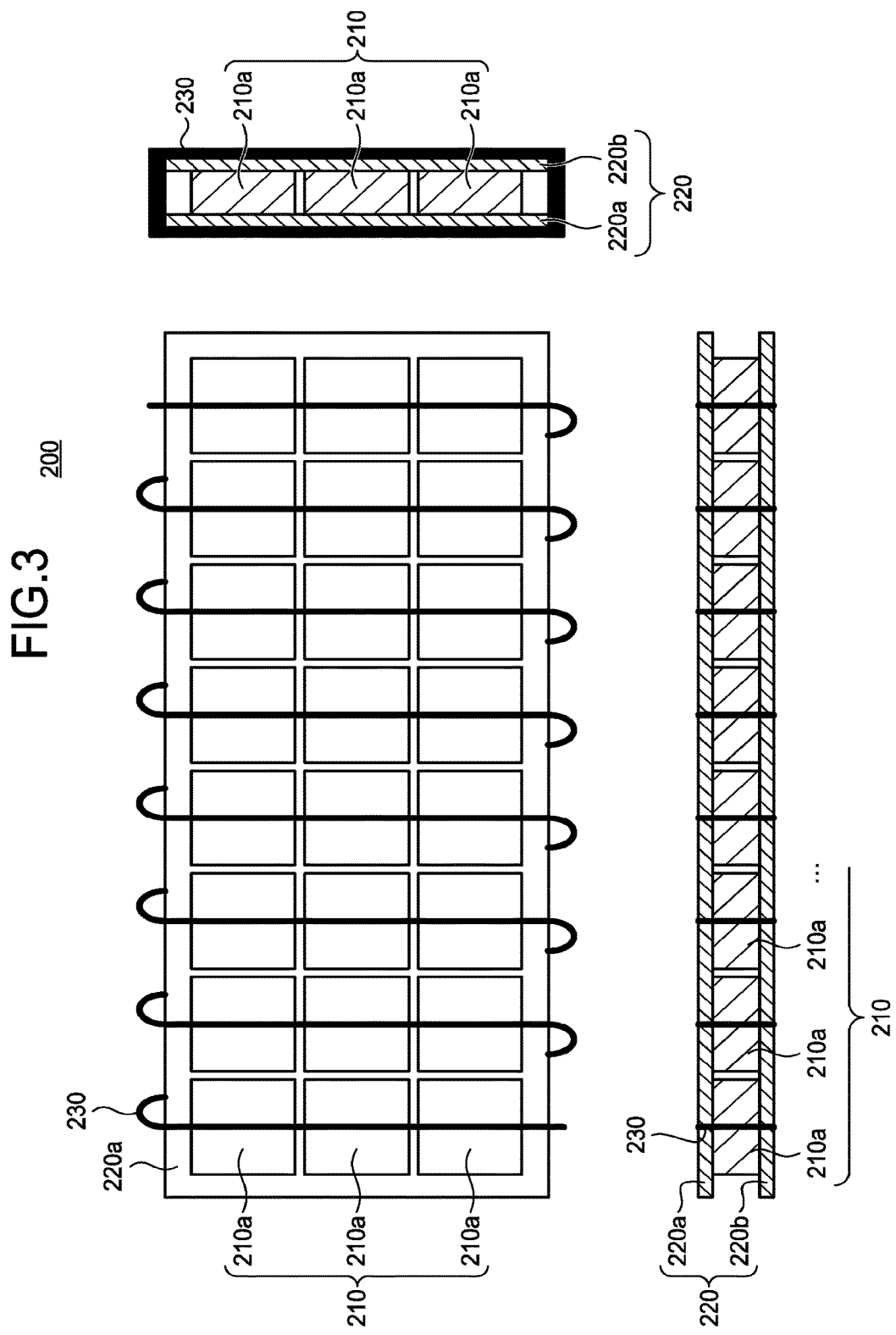
FIG. 3 is a diagram illustrating three views of an antenna device of a first embodiment.

An antenna device 200 of the first embodiment is described below. FIG. 3 is a diagram illustrating three views of the antenna device of the first embodiment. The antenna device 200 of the first embodiment includes a magnetic member unit 210 formed by laying out magnetic-member individual pieces 210a, in contrast to the antenna device 10 where the magnetic member unit 11 is a single sheet having flexibility. The antenna device 200 includes, as its relevant elements, the magnetic member unit 210, resin members 220, and a coil 230.

The magnetic member unit 210 is formed by equidistantly laying out the magnetic-member individual pieces 210a, each of which has a rectangular parallelepiped shape. The magnetic-member individual pieces 210a are produced by cutting such a plate-like, rectangular parallelepiped magnetic member as the magnetic member unit 11 into individual pieces. In the first embodiment, the magnetic-member individual piece 210a is a square that is 2 mm on each side, for example. A material similar to that of the antenna device 10 may be used as the material of the magnetic member unit 210.

The resin members 220 fix the magnetic-member individual pieces 210a to predetermined positions by sandwiching the magnetic member unit 210 therebetween. The resin members 220 may be made of, for example, PET (Polyethylene Terephthalate) or a heat-resistant resin, such as polyimide.

The coil 230 is formed by sparsely winding a conductive wire around the magnetic member unit 210, which is formed by laying out the magnetic-member individual pieces 210a, in the short-side direction (the X-axis direction) of the magnetic member unit 210 a plurality of times. In the coil 230, adjacent loops of the conductive wire wound around the magnetic member unit 210 are spaced apart a predetermined distance. Accordingly, the conductive wire is wound around the entire magnetic member unit 210, and each of the magnetic-member individual pieces 210a can generate magnetic flux. The conductive wire of the coil 230 is similar to that of the antenna device 10 in material, thickness, and the like and is coated with enamel.

Figure 4:
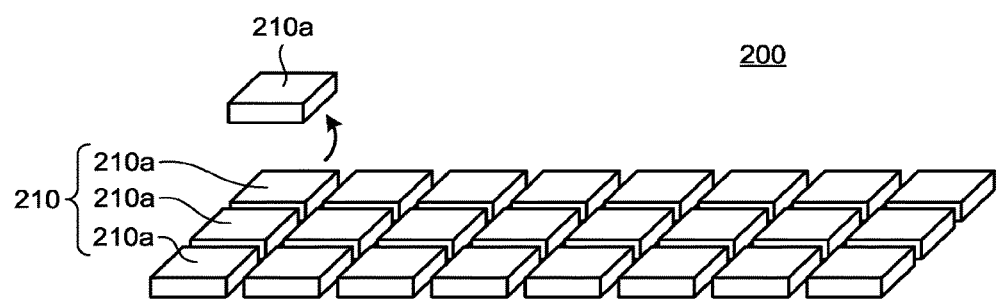
FIG. 4 is a diagram illustrating an example of magnetic-member individual pieces that are laid out.
Figure 5:
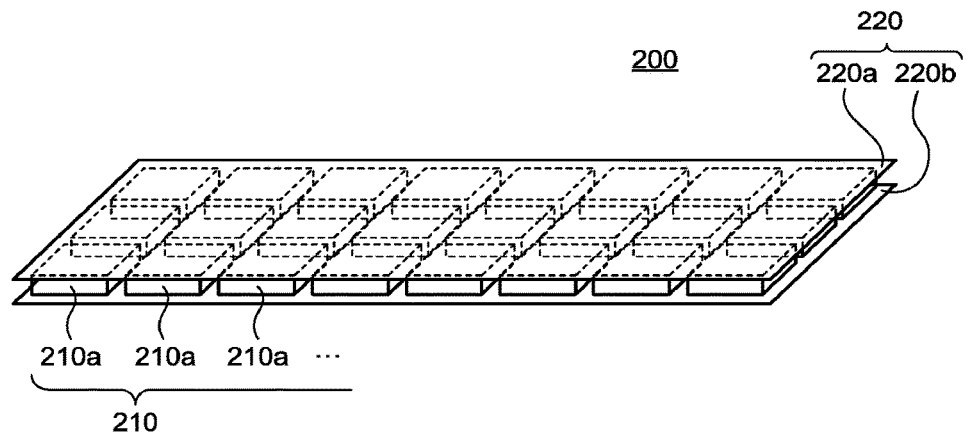
FIG. 5 is a diagram illustrating an example, in which a magnetic member unit formed by laying out the magnetic-member individual pieces is sandwiched between resin members.
Figure 6:
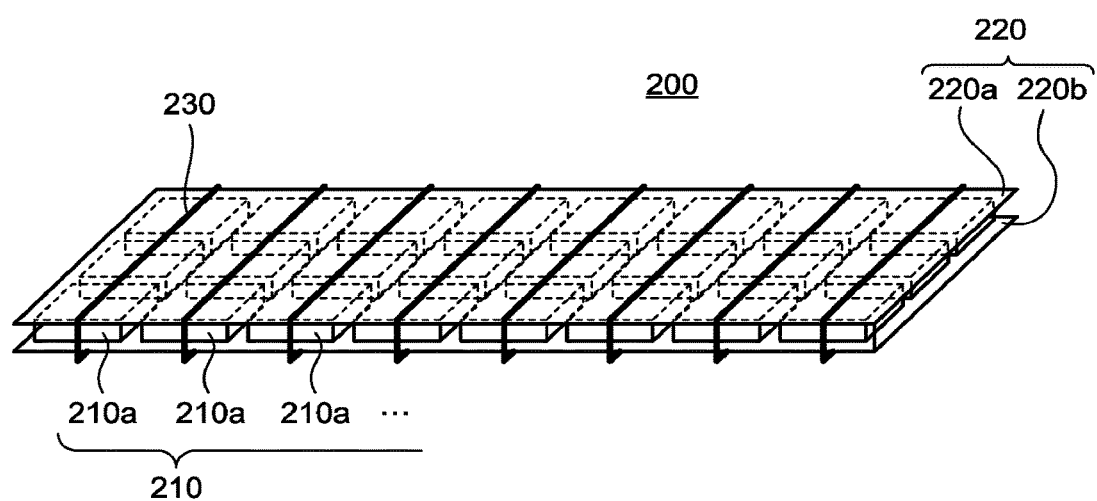
FIG. 6 is a diagram illustrating an example, in which a conductive wire is wound around the magnetic member unit.

A method for manufacturing the antenna device 200 is described below with reference to the drawings. FIG. 4 is a diagram illustrating an example of the magnetic-member individual pieces that are laid out. FIG. 5 is a diagram illustrating an example, in which the magnetic member unit formed by laying out the magnetic-member individual pieces is sandwiched between the resin members. FIG. 6 is a diagram illustrating an example, in which a conductive wire is wound around the magnetic member unit.

To manufacture the antenna device 200 of the first embodiment, the plurality of magnetic-member individual pieces 210a are produced first by cutting a plate-like, rectangular parallelepiped magnetic member into individual pieces. Next, to manufacture the antenna device 200, the magnetic member unit 210 is formed by equidistantly laying out the magnetic-member individual pieces 210a as illustrated in FIG. 4. Laying out the magnetic-member individual pieces 210a equidistantly allows a magnetic force to be produced in good balance. In the magnetic member unit 210 of the antenna device 200 of the first embodiment, the magnetic-member individual pieces 210a are laid out in an 8-by-3 matrix.

The resin members 220 (resin members 220a and 220b) sandwich the magnetic member unit 210, i.e., the magnetic-member individual pieces 210a laid out as illustrated in FIG. 4, therebetween, thereby fixing the magnetic member unit 210 as illustrated in FIG. 5. Specifically, the magnetic-member individual pieces 210a are fixed to a desired position by arranging the resin member 220a above the magnetic member unit 210 and the resin member 220b below the same.

The coil 230 is formed by winding the conductive wire around the magnetic member unit 210 sandwiched between the resin members 220 as illustrated in FIG. 6. The antenna device 200 is thus manufactured.

Magnetic flux density of the antenna device 200 is described below. FIG. 7A to FIG. 9B illustrate simulation results of magnetic flux vector characteristics of an antenna device where a single piece of magnetic member is used as a magnetic member unit and the antenna device 200 where the magnetic member unit 210 is formed by laying out the square magnetic-member individual pieces 210a.

Figure 7A:
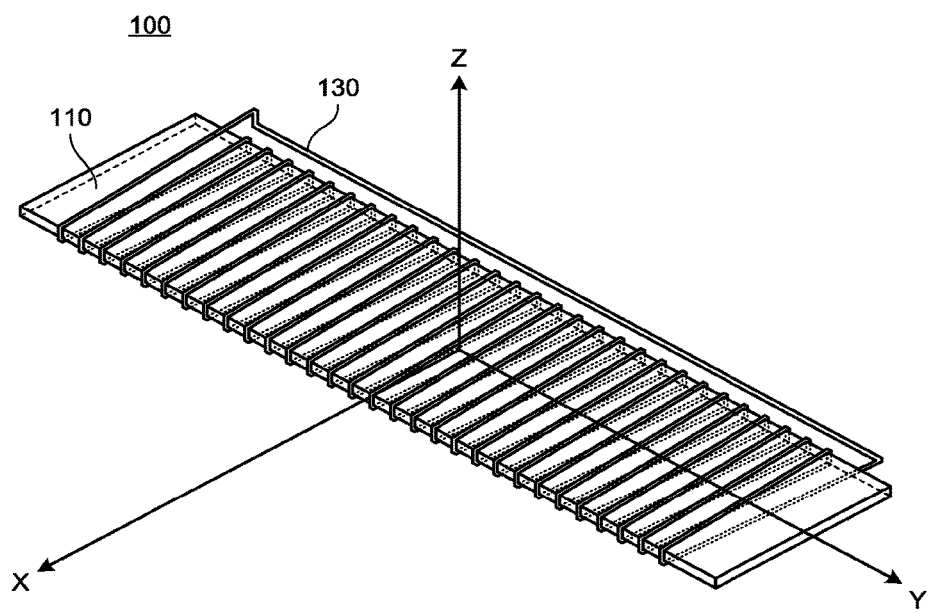
FIG. 7A and FIG. 7B are diagrams illustrating a simulation result of magnetic flux density around the antenna device.
Figure 7B:
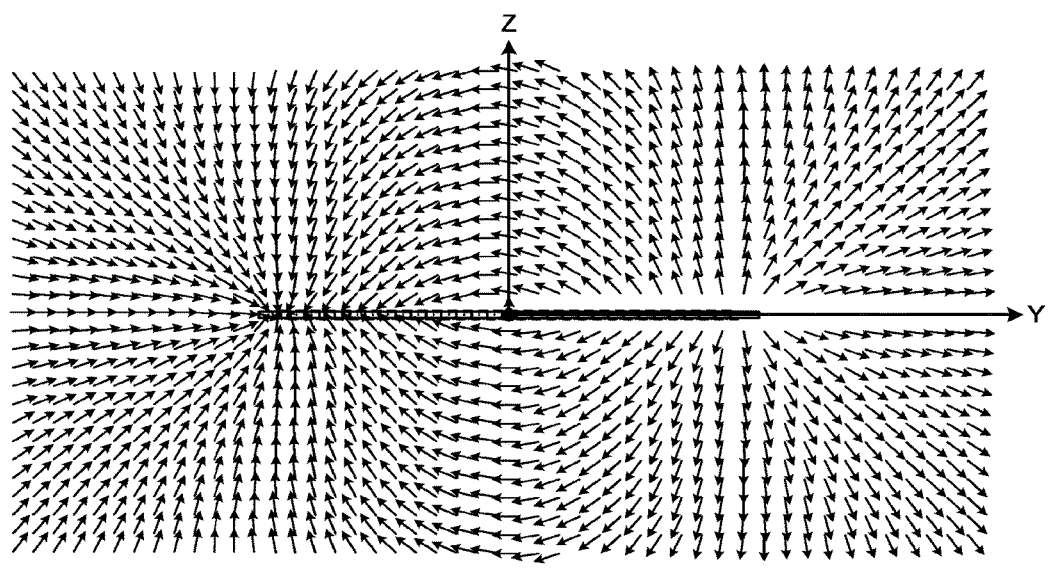

FIG. 7A and FIG. 7B are diagrams illustrating a simulation result of magnetic flux density around an antenna device. A magnetic member unit 110 illustrated in FIG. 7A and FIG. 7B is a single piece of magnetic member or magnetic-member individual pieces laid out with no clearance left therebetween.

The simulation model illustrated in FIG. 7A is a 3D model of an antenna device 100, in which a copper wire of a coil 130 is wound around the plate-like magnetic member unit 110. The simulation result illustrated in FIG. 7B is a result of performing an electromagnetic field simulation using the simulation model of FIG. 7A to simulate how magnetic flux behaves in the Y-Z plane. Arrows shown in FIG. 7B represent magnetic flux vectors and indicate that magnetic flux is generated in the directions indicated by the arrows.

The magnetic member unit 110 illustrated in FIG. 7A and FIG. 7B is 3 mm in the X direction and 12 mm in the Y direction. The magnetic member unit 110 can be regarded as an equivalent to a plurality of (3×12=36 pieces of) magnetic-material individual pieces, each of which is 1 mm on each side, laid out with no clearance left therebetween.

Figure 8A:
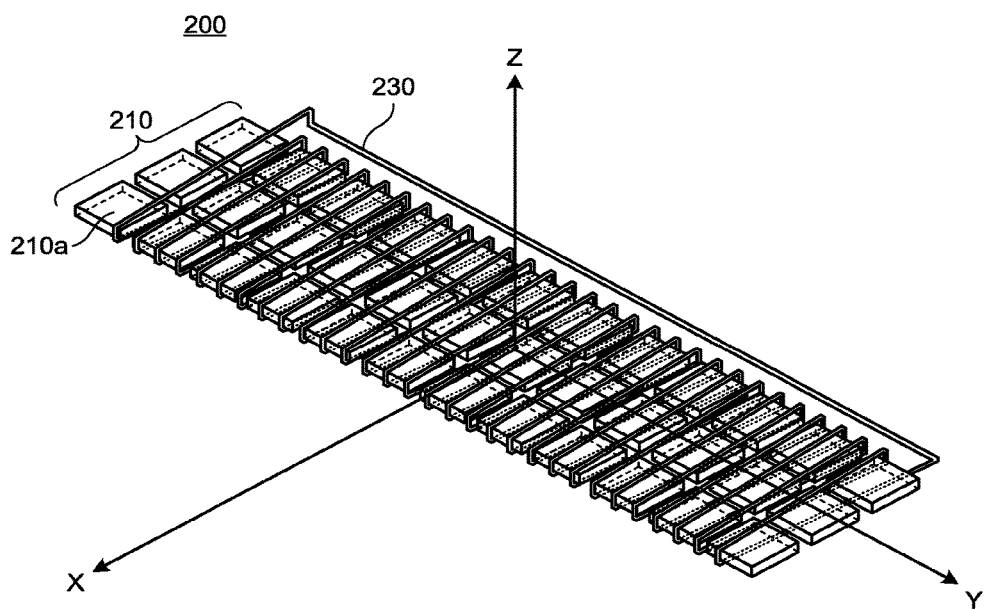
FIG. 8A and FIG. 8B are diagrams illustrating a simulation result of magnetic flux density around the antenna device, in which the magnetic member unit is formed by laying out square magnetic-member individual pieces.
Figure 8B:
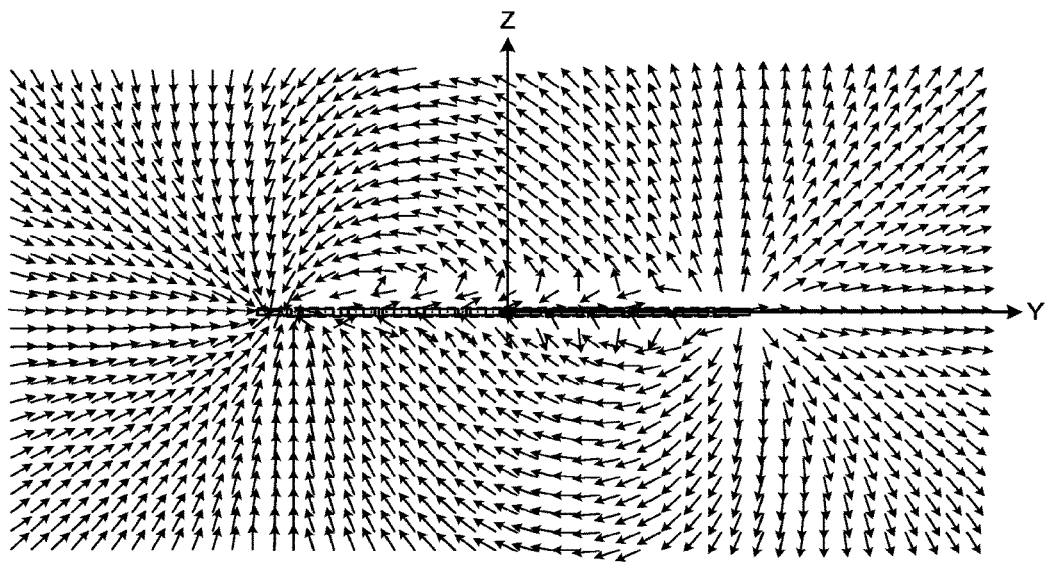

FIG. 8A and FIG. 8B are diagrams illustrating a simulation result of magnetic flux density around the antenna device, in which the magnetic member unit is formed by laying out the square magnetic-member individual pieces. In the magnetic member unit 210 illustrated in FIG. 8A and FIG. 8B, the magnetic-member individual pieces 210a are each spaced by 0.2 mm.

The simulation model illustrated in FIG. 8A is a 3D model of the antenna device 200, in which a copper wire of the coil 230 is wound around the magnetic member unit 210. The simulation result illustrated in FIG. 8B is a result of performing an electromagnetic field simulation using the simulation model of FIG. 8A to simulate how magnetic flux behaves in the Y-Z plane. Arrows shown in FIG. 8B represent magnetic flux vectors and indicate that magnetic flux is generated in the directions indicated by the arrows.

The magnetic member unit 210 of the antenna device 200 illustrated in FIG. 8A and FIG. 8B is formed by cutting a single-plate magnetic member into individual pieces and laying out 3×12(=36) pieces of the individual pieces. The magnetic-member individual piece 210a is 0.8 mm on each side. Hence, when the magnetic-member individual piece of the antenna device 100 is 1 mm on each side, the magnetic-member individual piece 210a can be regarded as an equivalent to the magnetic-member individual piece, each side of which has undergone size reduction to 80%, of the antenna device 100.

The size of the magnetic member unit 210, i.e., the laid-out magnetic-member individual pieces 210a, is 2.8 mm in the X direction and 11.8 mm in the Y direction. A similar result can be obtained by leaving the size of each side of the magnetic-member individual piece 210a unchanged from 1 mm but setting the clearance between the magnetic-member individual pieces 210a to 0.2 mm.

Figure 9A:
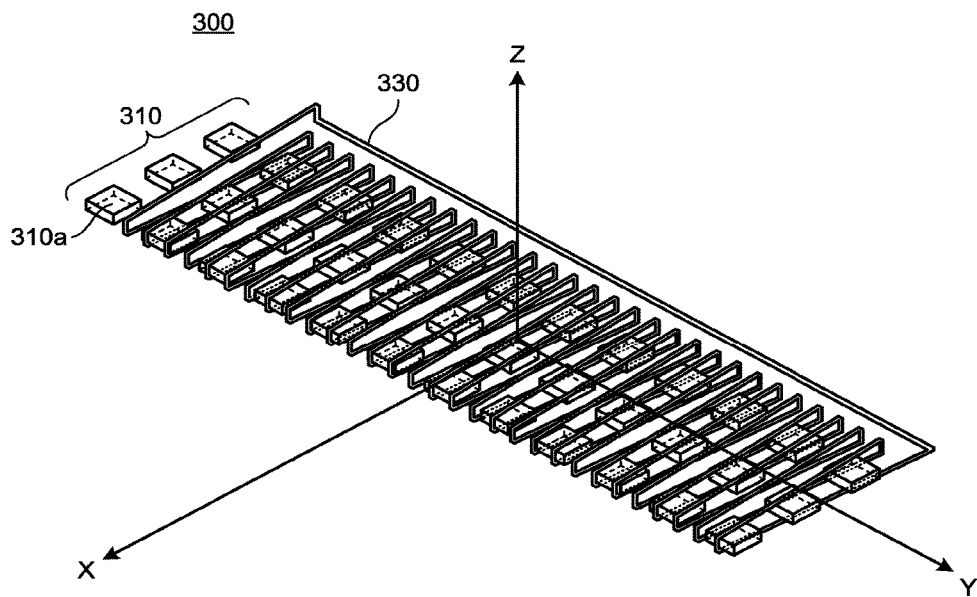
FIG. 9A and FIG. 9B are diagrams illustrating a simulation result of magnetic flux density around another antenna device, in which a magnetic member unit is formed by laying out square magnetic-member individual pieces.
Figure 9B:
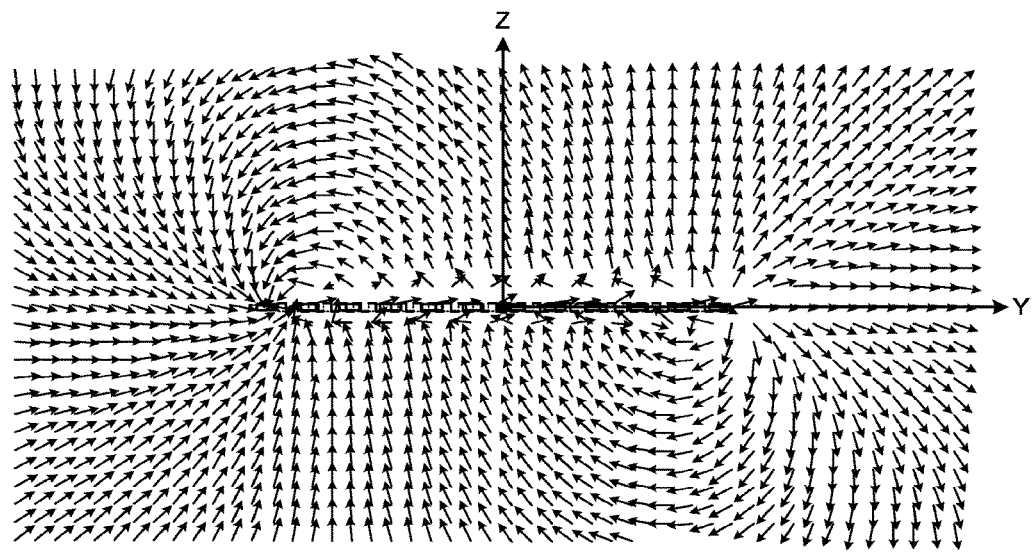

FIG. 9A and FIG. 9B are diagrams illustrating a simulation result of magnetic flux density around another antenna device, in which a magnetic member unit is formed by laying out square magnetic-member individual pieces. In a magnetic member unit 310 illustrated in FIG. 9A and FIG. 9B, magnetic-member individual pieces 310a are each spaced by 0.5 mm.

The simulation model illustrated in FIG. 9A is a 3D model of an antenna device 300, in which a copper wire of a coil 330 is wound around the magnetic member unit 310. The simulation result illustrated in FIG. 9B is a result of performing an electromagnetic field simulation using the simulation model of FIG. 9A to simulate how magnetic flux behaves in the Y-Z plane. Arrows shown in FIG. 9B represent magnetic flux vectors and indicate that magnetic flux is generated in the directions indicated by the arrows.

The magnetic member unit 310 of the antenna device 300 illustrated in FIG. 9A and FIG. 9B is formed by cutting a single-plate magnetic member into individual pieces and laying out 3×12(=36) pieces of the individual pieces. The magnetic-member individual piece 310a is 0.5 mm on each side. Hence, when the magnetic-member individual piece of the antenna device 100 is 1 mm on each side, the magnetic-member individual piece 310a can be regarded as an equivalent to the magnetic-member individual piece, each side of which has undergone size reduction to 50%, of the antenna device 100.

The size of the magnetic member unit 310, i.e., the laid-out magnetic-member individual pieces 310a, is 2.5 mm in the X direction and 11.5 mm in the Y direction. A similar result can be obtained by leaving the size of each side of the magnetic-member individual piece 310a unchanged from 1 mm but setting the clearance between the magnetic-member individual pieces 310a to 0.5 mm.

The simulation results (FIG. 7A to FIG. 9B) described above indicate the following.

It is indicated that, in the antenna device 100 where the magnetic member unit 110 is formed by laying out the magnetic-member individual pieces with no clearance left therebetween, while magnetic flux vectors are directed from one end surface to the other end surface of the magnetic member unit 110, substantially no magnetic flux vector is directed in the Z direction from a portion between the both end surfaces (see FIG. 7A and FIG. 7B).

As illustrated in FIG. 7A and FIG. 7B, the antenna device 100, in which the plurality of magnetic-member individual pieces are laid out with no clearance left therebetween, generates magnetic flux directed primarily in the X-axis direction and in the Y-axis direction.

It is indicated that, by contrast, in the antenna device 200 where the magnetic member unit 210 is formed by laying out the magnetic-member individual pieces 210a, in addition to magnetic flux vectors directed from one end surface to the other end surface of the magnetic member unit 210, magnetic flux vectors directed in the Z direction from a portion between the both end surfaces is generated (see FIG. 8A and FIG. 8B).

In the magnetic member unit 210 illustrated in FIG. 8A and FIG. 8B, the magnetic-member individual pieces 210a are laid out such that the clearance (0.2 mm) between the magnetic-member individual pieces 210a is 25% as long as the each side (0.8 mm) of the magnetic-member individual piece 210a.

Thus, laying out the plurality of magnetic-member individual pieces 210a such that the clearance between the magnetic-member individual pieces 210a is smaller than half the length of one side of the magnetic-member individual piece 210a causes the antenna device 200 to generate magnetic flux uniformly in the X-axis direction, in the Y-axis direction, and in the Z-axis direction.

Furthermore, it is indicated that the greater the clearance between the laid out magnetic-member individual pieces 310a, the more the magnetic flux vectors are directed in the Z direction from the portion between the both end surfaces (see FIG. 9A and FIG. 9B).

In the magnetic member unit 310 illustrated in FIG. 9A and FIG. 9B, the magnetic-member individual pieces 310a are laid out such that the clearance (0.5 mm) between the magnetic-member individual pieces 310a is 100% as long as the each side (0.5 mm) of the magnetic-member individual piece 310a.

Thus, laying out the plurality of magnetic-member individual pieces 310a such that the clearance between the magnetic-member individual pieces 310a is larger than half the length of one side of the magnetic-member individual piece 310a causes the antenna device 300 to generate magnetic flux primarily in the Z-axis direction.

Presence of a large number of magnetic fluxes directed from the portion sandwiched between the both end surfaces in the Z-axis direction indicates that high magnetic field intensity is produced not only at the both end surfaces but also at the portion sandwiched between the both end surfaces. Thus, the antenna device 200, 300 of the first embodiment is configured to include the magnetic member unit 210, 310 formed by laying out the rectangular parallelepiped magnetic-member individual pieces 210a, 310a at predetermined intervals and can therefore provide a wider communication coverage area than the antenna device 10 that includes the magnetic member unit 11 formed of a single piece of magnetic member.

Second Embodiment

While the antenna device of the first embodiment includes the magnetic member unit formed by laying out the square magnetic-member individual pieces, the magnetic-member individual pieces may have a shape other than a square. An antenna device of a second embodiment includes a magnetic member unit formed by laying out rectangular magnetic-member individual pieces.

FIG. 10 is a diagram illustrating three views of the antenna device of the second embodiment. An antenna device 400 of the second embodiment includes, as its relevant elements, a magnetic member unit 410, resin members 420, and a coil 430.

The magnetic member unit 410 is formed by equidistantly laying out magnetic-member individual pieces 410a, each of which has a rectangular parallelepiped shape. The magnetic-member individual pieces 410a are formed by cutting such a plate-like, rectangular parallelepiped magnetic member as the magnetic member unit 11 into individual pieces as in the first embodiment. In the second embodiment, the magnetic-member individual piece 410a is a rectangle that is 6 mm on the long side and 2 mm on the short side, for example. A material similar to that of the antenna device 10 may be used as the material of the magnetic member unit 410.

The resin members 420 fix the magnetic-member individual pieces 410a to predetermined positions by sandwiching the magnetic member unit 410 therebetween as in the first embodiment.

The coil 430 is formed by sparsely winding a conductive wire, such as a copper wire, around the magnetic member unit 410, which is formed by laying out the magnetic-member individual pieces 410a, in the short-side direction (the X-axis direction) of the magnetic member unit 410 a plurality of times as in the first embodiment. In the coil 430, adjacent loops of the conductive wire wound around the magnetic member unit 410 are spaced apart a predetermined distance. The conductive wire of the coil 430 is similar to that of the antenna device 10 in material, thickness, and the like and is coated with enamel.

Figure 11:
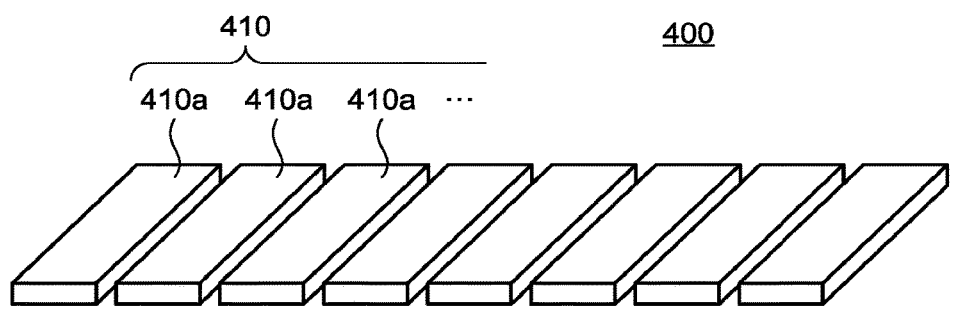
FIG. 11 is a diagram illustrating an example of magnetic-member individual pieces that are laid out.
Figure 12:
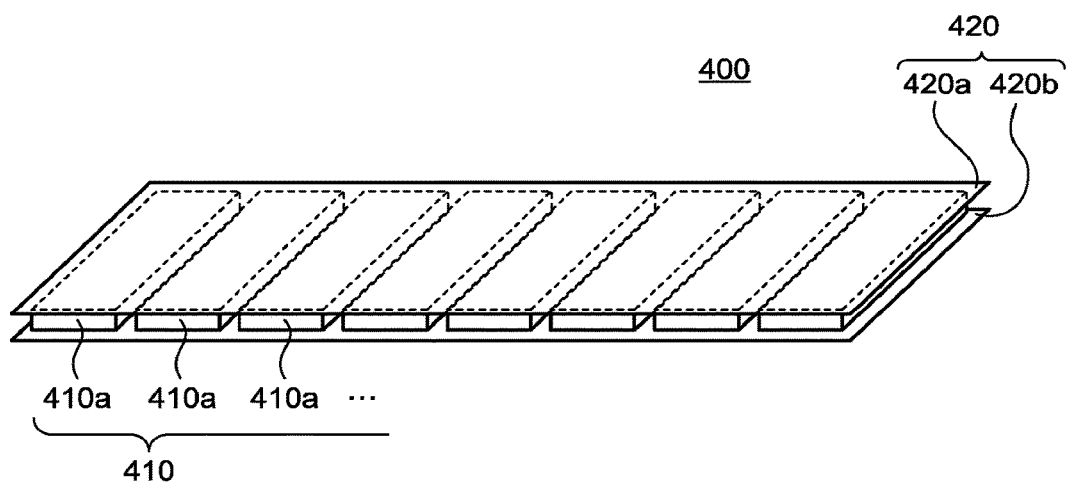
FIG. 12 is a diagram illustrating an example, in which a magnetic member unit formed by laying out the magnetic-member individual pieces is sandwiched between resin members.
Figure 13:
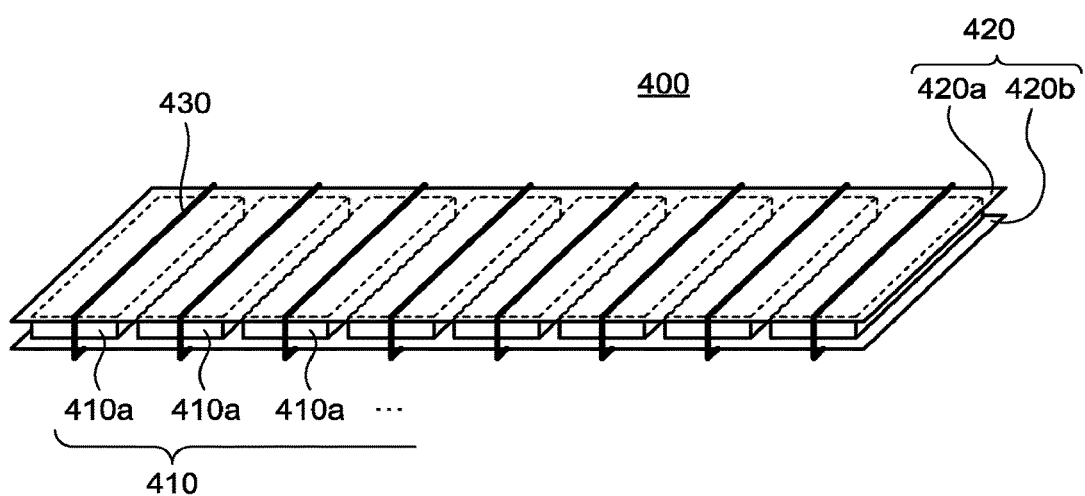
FIG. 13 is a diagram illustrating an example, in which a conductive wire is wound around the magnetic member unit.

A process of manufacturing the antenna device 400 is described below with reference to the drawings. FIG. 11 is a diagram illustrating an example of the magnetic-member individual pieces that are laid out. FIG. 12 is a diagram illustrating an example, in which the magnetic member unit formed by laying out the magnetic-member individual pieces is sandwiched between the resin members. FIG. 13 is a diagram illustrating an example, in which a conductive wire is wound around the magnetic member unit.

To manufacture the antenna device 400 of the second embodiment, the plurality of magnetic-member individual pieces 410a are produced first by cutting a plate-like, rectangular parallelepiped magnetic member into individual pieces. Next, to manufacture the antenna device 400, the magnetic member unit 410 is formed by equidistantly laying out the magnetic-member individual pieces 410a as illustrated in FIG. 11. In the magnetic member unit 410 of the antenna device 400 of the second embodiment, the magnetic-member individual pieces 410a are arranged in eight lines with their long sides adjacent to each other.

The resin members 420 (resin members 420a and 420b) sandwich the magnetic member unit 410, i.e., the magnetic-member individual pieces 410a laid out as illustrated in FIG. 11, therebetween, thereby fixing the magnetic member unit 410 as illustrated in FIG. 12. Specifically, the magnetic member unit 410 is fixed to a desired position by arranging the resin member 420a above the magnetic member unit 410 and the resin member 420b below the same.

The coil 430 is formed by winding the conductive wire around the magnetic member unit 410 sandwiched between the resin members 420 as illustrated in FIG. 13. The antenna device 400 is thus manufactured.

Magnetic flux density of the antenna device 400 is described below. FIG. 14A to FIG. 15B illustrate simulation results of magnetic flux vector characteristics of the antenna device 400 where the magnetic member unit 410 is formed by laying out the rectangular magnetic-member individual pieces 410a.

Figure 14A:
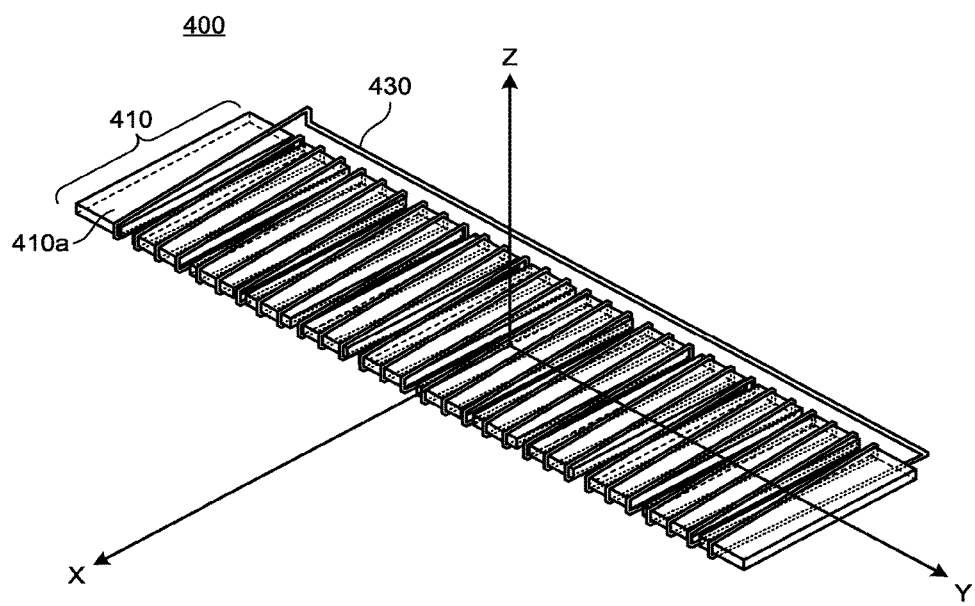
FIG. 14A and FIG. 14B are diagrams illustrating a simulation result of magnetic flux density around the antenna device, in which the magnetic member unit is formed by laying out the rectangular magnetic-member individual pieces.
Figure 14B:
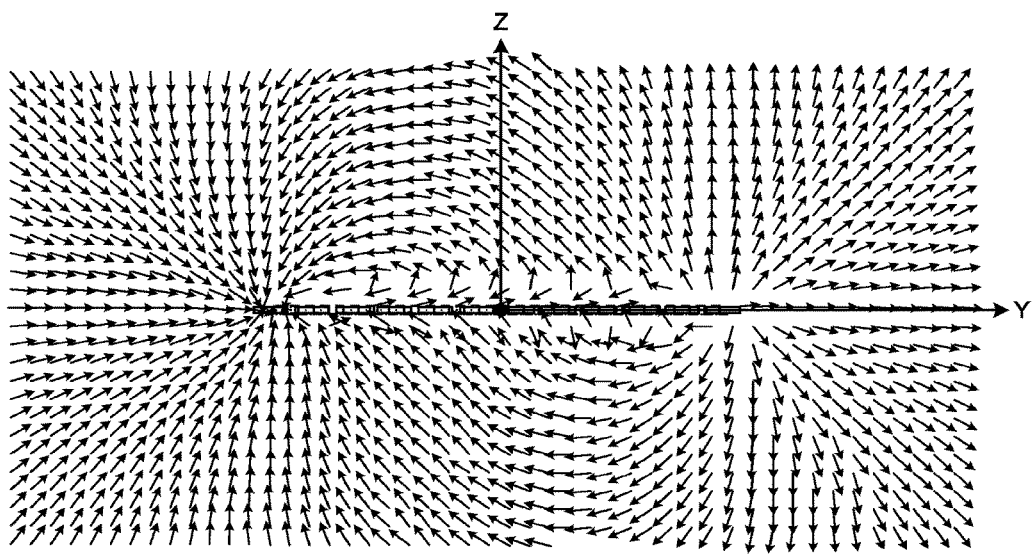

FIG. 14A and FIG. 14B are diagrams illustrating a simulation result of magnetic flux density around the antenna device, in which the magnetic member unit is formed by laying out the rectangular magnetic-member individual pieces. In the magnetic member unit 410 illustrated in FIG. 14A and FIG. 14B, the magnetic-member individual pieces 410a are each spaced by 0.2 mm.

The simulation model illustrated in FIG. 14A is a 3D model of the antenna device 400, in which a conductive wire of the coil 430 is wound around the magnetic member unit 410. The simulation result illustrated in FIG. 14B is a result of performing an electromagnetic field simulation using the simulation model of FIG. 14A to simulate how magnetic flux behaves in the Y-Z plane. Arrows shown in FIG. 14B represent magnetic flux vectors and indicate that magnetic flux is generated in the directions indicated by the arrows.

The magnetic member unit 410 of the antenna device 400 illustrated in FIG. 14A and FIG. 14B is formed by cutting a single-plate magnetic member along the Y-axis direction into individual pieces and laying out 1×12(=12) pieces of the individual pieces. The magnetic-member individual piece 410a is 0.8 mm on the short side. Accordingly, when the magnetic-member individual piece of the antenna device 100 is 1 mm on the short side, the magnetic-member individual piece 410a can be regarded as an equivalent to the magnetic-member individual piece, whose short side has undergone size reduction to 80%, of the antenna device 100.

The size of the magnetic member unit 410, i.e., the laid-out magnetic-member individual pieces 410a, is 3 mm in the X direction and 11.8 mm in the Y direction. A similar result can be obtained by leaving the size of the short side of the magnetic-member individual piece 410a unchanged from 1 mm but setting the clearance between the magnetic-member individual pieces 410a to 0.2 mm.

Figure 15A:
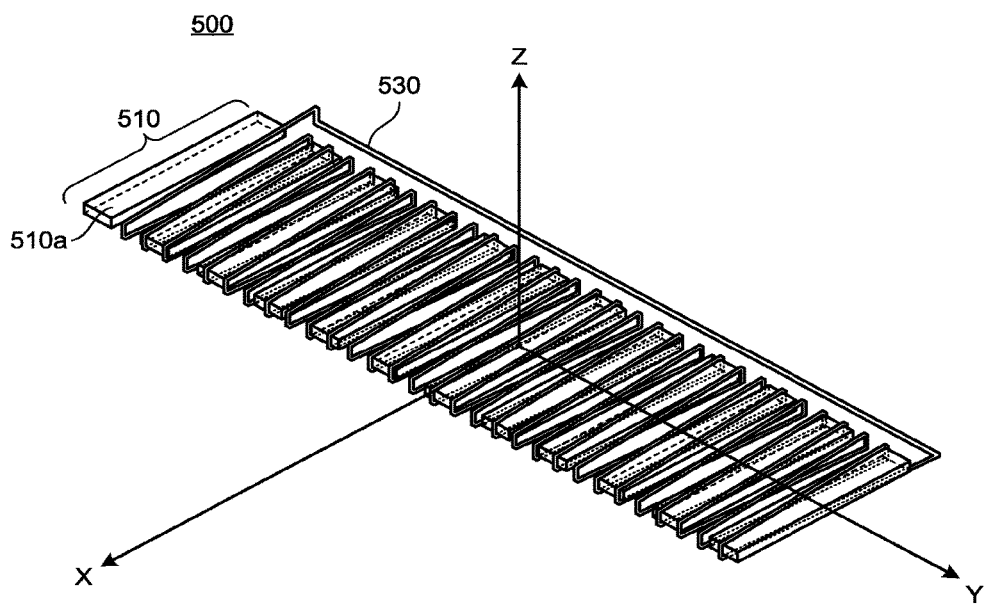
FIG. 15A and FIG. 15B are diagrams illustrating a simulation result of magnetic flux density around another antenna device, in which a magnetic member unit is formed by laying out rectangular magnetic-member individual pieces.
Figure 15B:
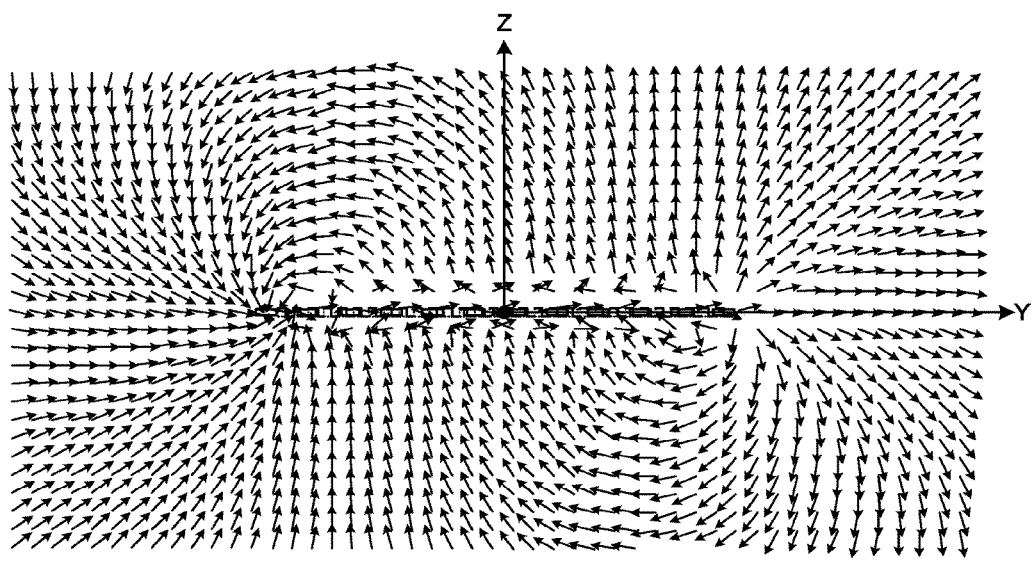

FIG. 15A and FIG. 15B are diagrams illustrating a simulation result of magnetic flux density around another antenna device, in which a magnetic member unit is formed by laying out rectangular magnetic-member individual pieces. In a magnetic member unit 510 illustrated in FIG. 15A and FIG. 15B, magnetic-member individual pieces 510a are each spaced by 0.5 mm.

The simulation model illustrated in FIG. 15A is a 3D model of an antenna device 500, in which a copper wire of a coil 530 is wound around the magnetic member unit 510. The simulation result illustrated in FIG. 15B is a result of performing an electromagnetic field simulation using the simulation model of FIG. 15A to simulate how magnetic flux behaves in the Y-Z plane. Arrows shown in FIG. 15B represent magnetic flux vectors and indicate that magnetic flux is generated in the directions indicated by the arrows.

The magnetic member unit 510 of the antenna device 500 illustrated in FIG. 15A and FIG. 15B is formed by cutting a single-plate magnetic member into individual pieces and laying out 1×12(=12) pieces of the individual pieces. The magnetic-member individual piece 510a is 0.5 mm on the short side. Accordingly, when the size on the short side of the magnetic-member individual piece of the antenna device 100 is 1 mm, the magnetic-member individual piece 510a can be regarded as an equivalent to the magnetic-member individual piece, whose short side has undergone size reduction to 50%, of the antenna device 100.

The size of the magnetic member unit 510, i.e., the laid-out magnetic-member individual pieces 510a, is 3 mm in the X direction and 11.5 mm in the Y direction. A similar result can be obtained by leaving the size of the short side of the magnetic-member individual piece 510a unchanged from 1 mm but setting the clearance between the magnetic-member individual pieces 510a to 0.5 mm.

The simulation results (FIG. 14A to FIG. 15B) described above indicate the following.

It is indicated that, when compared to the antenna device 100 illustrated in FIG. 7A and FIG. 7B where the magnetic member unit 110 is formed by laying out the magnetic-member individual pieces with no clearance left therebetween, in the antenna device 400 where the magnetic member unit 410 is formed by laying out the magnetic-member individual pieces 410a, in addition to magnetic flux vectors directed from one end surface to the other end surface of the magnetic member unit 410, magnetic flux vectors directed in the Z direction from a portion between the both end surfaces are generated (see FIG. 14A and FIG. 14B).

In the magnetic member unit 410 illustrated in FIG. 14A and FIG. 14B, the magnetic-member individual pieces 410a are laid out such that the clearance (0.2 mm) between the magnetic-member individual pieces 410a is 25% as long as the short side (0.8 mm) of the magnetic-member individual piece 410a. Thus, laying out the plurality of magnetic-member individual pieces 410a such that the clearance between the magnetic-member individual pieces 410a is smaller than half the length of one side of the magnetic-member individual piece 410a causes the antenna device 400 to generate magnetic flux uniformly in the X-axis direction, in the Y-axis direction, and in the Z-axis direction.

Furthermore, it is indicated that the greater the clearance between the laid out magnetic-member individual pieces 510a, the more the magnetic flux vectors directed in the Z direction are generated from the portion between the both end surfaces (see FIG. 15A and FIG. 15B).

In the magnetic member unit 510 illustrated in FIG. 15A and FIG. 15B, the magnetic-member individual pieces 510a are laid out such that the clearance (0.5 mm) between the magnetic-member individual pieces 510a is 50% as long as the short side (0.5 mm) of the magnetic-member individual piece 510a. Thus, laying out the plurality of magnetic-member individual pieces 510a such that the clearance between the magnetic-member individual pieces 510a is larger than half the length of one side of the magnetic-member individual piece 510a causes the antenna device 500 to generate magnetic flux primarily in the Z-axis direction.

Presence of a large number of magnetic fluxes directed from the portion sandwiched between the both end surfaces in the Z-axis direction indicates that high magnetic field intensity is produced not only at the both end surfaces but also at the portion sandwiched between the both end surfaces. Thus, the antenna device 400, 500 of the second embodiment is configured to include the magnetic member unit 410, 510 formed by laying out the rectangular parallelepiped magnetic-member individual pieces 410a, 510a side by side and can therefore provide a wider communication coverage area than the antenna device 10 that includes the magnetic member unit 11 formed of a single piece of magnetic member.

Third Embodiment

The antenna device of the first embodiment includes the magnetic member unit formed by laying out the square magnetic-member individual pieces. The antenna device of the second embodiment includes the magnetic member unit formed by laying out the rectangular magnetic-member individual pieces. By contrast, an antenna device of a third embodiment includes a magnetic member unit formed by laying out triangular magnetic-member individual pieces.

FIG. 16 is a diagram illustrating three views of the antenna device of the third embodiment. An antenna device 600 of the third embodiment includes, as its relevant elements, a magnetic member unit 610, resin members 620, and a coil 630. The resin members 620 and the coil 630 are similar to the resin members 230 and the coil 330 of the first embodiment, and repeated description is omitted.

The magnetic member unit 610 is formed by equidistantly laying out magnetic-member individual pieces 610a, each of which has a triangular prism shape. The magnetic-member individual pieces 610a are formed by cutting such a plate-like, rectangular parallelepiped magnetic member as the magnetic member unit 11 into individual pieces as in the first embodiment.

Figure 17:
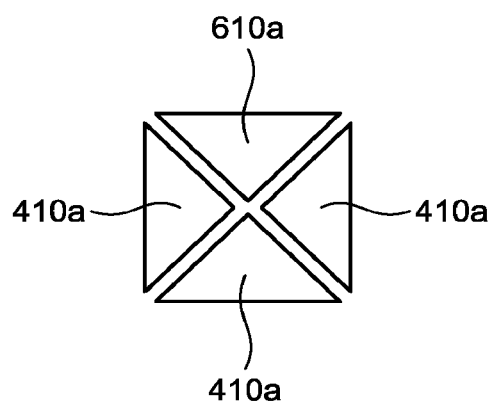
FIG. 17 is an explanatory diagram of magnetic-member individual pieces.

FIG. 17 is an explanatory diagram of the magnetic-member individual pieces. In the third embodiment, the magnetic-member individual pieces 610a are right-angled triangles produced by cutting the two diagonals of a square. In the third embodiment, the magnetic-member individual piece 610a is a right-angled triangle that is $\sqrt{2}$ mm on the long side and 1 mm on each of the short sides, for example.

Thus, the antenna device 600 of the third embodiment is configured to include the magnetic member unit 610 formed by laying out the triangular-prism-shaped magnetic-member individual pieces 610a at predetermined intervals and can therefore provide a wider communication coverage area than the antenna device 10 that includes the magnetic member unit 11 formed of a single piece of magnetic member. Forming the magnetic-member individual pieces 610a in the triangular prism shape increases the number of side surfaces, thereby generating more magnetic fluxes, which leads to a still wider communication coverage area.

According to an aspect of the present invention, an antenna device less susceptible to a metal present near the device or the apparatus and providing a wider communication coverage area can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An antenna device formed by winding a conductive wire around a magnetic member, the conductive wire forming a coil having a central axis,
   wherein the magnetic member comprises a plurality of magnetic-member individual pieces spaced apart from each other, including a first row of magnetic-member individual pieces, the first row being arranged in a direction of the central axis of the coil, and
   wherein the plurality of magnetic-member individual pieces further includes a second row of magnetic member-individual pieces, the second row being arranged in a direction of the central axis of the coil and being adjacent to the first row.

2. The antenna device according to claim 1, wherein, in the magnetic member, the plurality of magnetic-member individual pieces are made of sheet members.

3. The antenna device of claim 1, wherein the magnetic member is a flexible sheet member having flexibility.

4. The antenna device of claim 1, further comprising resin members, wherein the magnetic-member individual pieces are fixed by being sandwiched between the resin members.

5. An antenna device formed by winding a conductive wire around a magnetic member, the conductive wire forming a coil having a central axis, wherein the magnetic member comprises a plurality of magnetic-member individual pieces spaced apart from each other, including a first row of magnetic-member individual pieces, the first row being arranged in a direction of the central axis of the coil, wherein the plurality of magnetic-member individual pieces are arranged in an n×m array, wherein n and m are integers greater than one.

6. An antenna device formed by winding a conductive wire around a magnetic member, wherein the magnetic member comprises a plurality of magnetic-member individual pieces that are equidistantly spaced apart from each other and arranged in an n×m array, wherein n and m are integers greater than one.

7. The antenna device of claim 6, wherein the magnetic member is a flexible sheet member having flexibility.

8. The antenna device of claim 6, further comprising resin members, wherein the magnetic-member individual pieces are fixed by being sandwiched between the resin members.

* * * * *